(12) United States Patent
Park et al.

(10) Patent No.: US 9,088,223 B2
(45) Date of Patent: Jul. 21, 2015

(54) POWER FACTOR CORRECTION CIRCUIT WITH INPUT VOLTAGE ESTIMATION AND DRIVING METHOD THEREOF

(75) Inventors: Young-Bae Park, Gyeonggi-do (KR); Sang Cheol Moon, Gyeonggi-do (KR); Byoung Heon Kim, Gyeonggi-do (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 227 days.

(21) Appl. No.: 12/730,643

(22) Filed: Mar. 24, 2010

(65) Prior Publication Data

US 2010/0270984 A1 Oct. 28, 2010

(30) Foreign Application Priority Data

Apr. 27, 2009 (KR) .................. 10-2009-0036735

(51) Int. Cl.
*H02M 1/42* (2007.01)
(52) U.S. Cl.
CPC .............. *H02M 1/4225* (2013.01); *H02M 1/42* (2013.01); *Y02B 70/126* (2013.01)
(58) Field of Classification Search
CPC ....... H02M 1/4225; Y02B 70/126; G05F 1/70
USPC ......... 323/205, 207, 222, 282, 283, 285, 288, 323/299
See application file for complete search history.

(56) References Cited

U.S. PATENT DOCUMENTS

| | | | |
|---|---|---|---|
| 5,825,165 A * | 10/1998 | Kitching et al. | 323/282 |
| 6,175,218 B1 * | 1/2001 | Choi et al. | 323/222 |
| 6,541,948 B1 * | 4/2003 | Wong | 323/284 |
| 6,839,247 B1 * | 1/2005 | Yang et al. | 363/21.11 |
| 7,116,090 B1 * | 10/2006 | Yang et al. | 323/288 |
| 2006/0061337 A1 * | 3/2006 | Kim et al. | 323/205 |
| 2008/0272755 A1 * | 11/2008 | Melanson | 323/282 |
| 2010/0067270 A1 * | 3/2010 | Odell | 363/89 |

FOREIGN PATENT DOCUMENTS

CN 1753290 A 3/2006

OTHER PUBLICATIONS

Merriam-Webster Dictionary and Thesaurus, http://www.merriam-webster.com/dictionary/estimate.*

* cited by examiner

*Primary Examiner* — Jessica Han
*Assistant Examiner* — Gustavo Rosario Benitez
(74) *Attorney, Agent, or Firm* — Okamoto & Benedicto LLP

(57) ABSTRACT

A power factor correction circuit includes an inductor, a power switch, and a power factor correction controller. The power factor correction controller receives information on an inductor voltage to control a switching operation of the power switch. The power factor controller estimates an input voltage according to the duty ratio of the power switch.

17 Claims, 13 Drawing Sheets

FIG. 3

| Input voltage | Load | Duty |
|---|---|---|
| 163V | 100% | 59% |
|  | 25% | 55% |
| 325V | 100% | 19% |
|  | 25% | 18% |

9,088,223 B2

POWER FACTOR CORRECTION CIRCUIT WITH INPUT VOLTAGE ESTIMATION AND DRIVING METHOD THEREOF

CROSS-REFERENCE TO RELATED APPLICATION

This application claims priority to and the benefit of Korean Patent Application No. 10-2009-0036735 filed in the Korean Intellectual Property Office on Apr. 27, 2009, the entire contents of which are incorporated herein by reference.

BACKGROUND OF THE INVENTION (a) Field of the Invention

The present invention relates to a power factor correction circuit, and a driving method thereof.

(b) Description of the Related Art

A power factor indicates effectiveness of power transmission. In transmission of power, actually transmitted power is real power. The power factor is shown by dividing real power by apparent power that is a product of real values of voltage and current of power. In this instance, when the voltage and the current are sine waves, the power factor is changed by a phase difference between the voltage and the current. The power factor is improved as the phase difference is reduced. Therefore, general power factor compensation for improving the power factor represents an operation for correcting a shape of an input current to be a sine wave shape and reducing a phase difference between the voltage and the current.

A conventional power factor correction circuit full-wave rectifies input AC power to generate an input voltage, and controls an inductor current to have a phase and a frequency close to the input voltage. The input current of the power factor correction circuit is a value generated by eliminating the radio frequency component from the inductor current by using a predetermined low-pass filter.

FIG. 11 shows an inductor current of a power factor correction circuit. As shown in FIG. 11, the inductor current has a sawtooth shape, and peak values have a sine wave shape shown by a dotted line. As shown in FIG. 11, the inductor current is filtered to generate a smooth input current shown with a thick solid line.

The power factor correction circuit controls the inductor current by controlling a switching operation of a switch connected to an inductor. Since the input current is determined according to the inductor current, the power factor correction circuit controls the input current by controlling the switching operation. Information on the input voltage may not be needed according to a method for driving the power factor correction circuit. In detail, a critical conduction mode power factor correction circuit (PFC) generates the inductor current and the input current shown in FIG. 11. The critical conduction mode power factor correction circuit uses the current and output voltage flowing to the switch to control the switching operation of the switch. Therefore, no additional input voltage information is required.

In general, a control circuit for controlling the power factor correction circuit is realized as a chip, and the existing control circuit chip includes an additional pin for receiving the input voltage. The existing control circuit chip uses a resistor for sensing the input voltage, but the resistor causes power consumption.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power factor correction circuit needing no information on an input voltage, and a method for driving the same.

In detail, the present invention has been made in an effort to provide a power factor correction circuit for estimating an input voltage without an additional pin and reducing power consumption, and a driving method thereof.

An exemplary embodiment of the present invention provides a power factor correction circuit including: an inductor for receiving an input voltage and supplying output power; a power switch for controlling input current flowing to the inductor, the power switch being connected to the inductor; and a power factor correction controller for receiving information on an output voltage of the output power and information on the inductor voltage to control a switching operation of the power switch and estimating the input voltage according to a duty of the power switch.

The power factor correction controller includes an input voltage information generator for generating a check signal that is increased/decreased according to the duty, and generating input voltage information for indicating information on an input voltage according to a voltage range of the check signal.

The input voltage information generator includes: a discharge switch for performing a switching operation according to a signal corresponding to the duty; a charge switch for performing a switching operation according to an inverting signal of a signal corresponding to the duty; a capacitor for generating the check signal, the capacitor having a first end connected to a node of the discharge switch and the charge switch; and an input voltage information generator for generating the input voltage information according to a voltage range of the check signal.

The signal corresponding to the duty controls the switching operation of the power switch.

The input voltage information generator generates input voltage information for indicating that the input voltage is low when the check signal has a voltage range that is near a ground voltage, and it generates input voltage information for showing that the input voltage is high when a period in which the check signal reaches a maximum check voltage is generated.

The power factor correction controller further includes: an error amplifier for generating an error amplifying signal by amplifying a difference between a division voltage corresponding to the output voltage and one of at least two error reference voltages according to the input voltage; a ramp signal generator for generating a ramp signal having a slope corresponding to the input voltage; and a PWM controller for turning off the power switch according to a comparison result of the ramp signal and the error amplifying signal, and determining whether to turn on the power switch according to information on the inductor voltage.

The ramp signal generator includes: at least two current sources; a capacitor; and at least two switches connected between the at least two current sources and the capacitor, wherein one of the at least two switches is turned on while the power switch is turned on, and another one of the at least two switches performs a switching operation according to the input voltage.

When the input voltage is high, the other switch is turned on.

The power factor correction circuit includes: an on control signal generator for generating an on control signal for turning on the power switch when an auxiliary voltage corresponding to information on the inductor voltage is less than a predetermined reference voltage; a PWM comparator for comparing the ramp signal and the error amplifying signal, and generating an off control signal for turning off the power switch according to a comparison result; a PWM flip-flop for generating a gate driver control signal for controlling a switching operation of the power switch according to the on control signal and the off control signal; and a gate driver for generating a gate signal for switching the power switch according to the gate driver control signal.

The auxiliary voltage is a voltage at an auxiliary inductor having a predetermined turn ratio for the inductor and being coupled to the inductor.

The duty is sensed by using one of the on control signal, the off control signal, the gate driver control signal, and the gate signal.

Another embodiment of the present invention provides a driving method of a power factor correction circuit including an inductor for receiving an input voltage and supplying an output power, and a power switch being connected to the inductor and controlling input current flowing to the inductor, including: receiving information on an output voltage of the output power and information on the inductor voltage, and controlling a switching operation of the power switch; and estimating the input voltage according to a duty of the power switch.

The estimating of the input voltage includes: generating a check signal that is increased/decreased according to the duty; and estimating an input voltage according to a voltage range of the check signal.

The generating of a check signal includes: reducing the check signal while the power switch is turned on; and increasing the check signal while the power switch is turned off.

The estimating of an input voltage includes: determining that the input voltage is low when the check signal has a voltage range that is near a ground voltage; and determining that the input voltage is high when a period in which the check signal reaches a maximum check voltage is generated.

The controlling of a switching operation includes: generating an error amplifying signal by amplifying a difference between a division voltage corresponding to the output voltage and one of at least two error reference voltages according to the input voltage; generating a ramp signal having a slope corresponding to the input voltage; turning off the power switch according to a comparison result of the ramp signal and the error amplifying signal; and turning on the power switch according to information on the inductor voltage.

The determining of whether to turn on the power switch includes turning on the power switch when an auxiliary voltage corresponding to information on the inductor voltage becomes less than a predetermined reference voltage.

The present invention provides a power factor correction circuit for estimating an input voltage without an additional pin and power consumption, and a method for driving the power factor correction circuit.

BRIEF DESCRIPTION OF THE DRAWINGS

FIG. 3 shows a table of a relationship between input voltage, load, and duty.

DETAILED DESCRIPTION OF THE EMBODIMENTS

Figure 1:
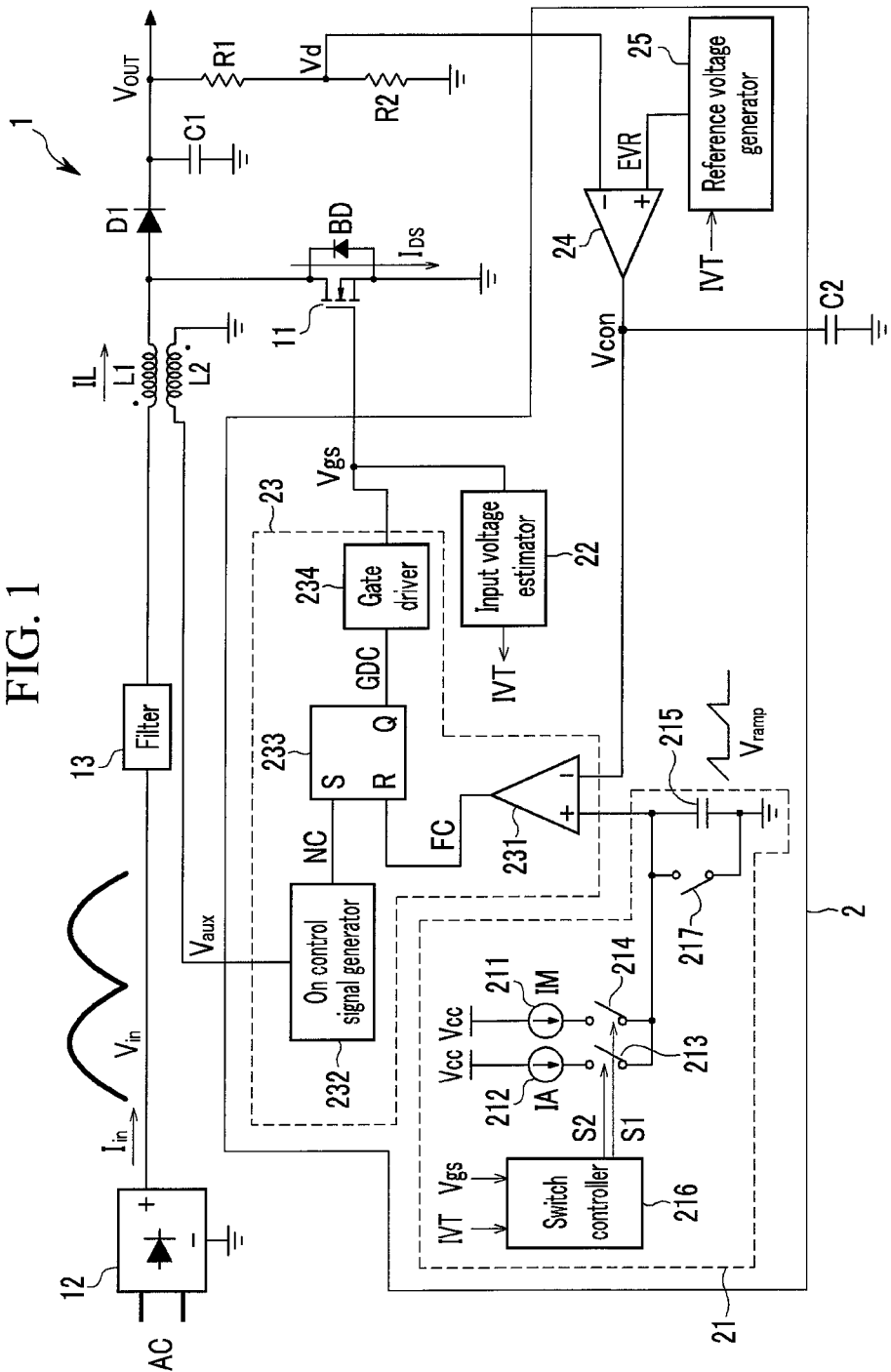
FIG. 1 shows a power factor correction circuit including an input voltage detecting device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 shows a critical conduction mode power factor correction circuit 1 including an input voltage detecting device according to an exemplary embodiment of the present invention.

As shown in FIG. 1, the power factor correction circuit 1 includes a power factor correction controller 2, a power switch 11, a bridge diode 12, a filter 13, a diode D1, a capacitor C1, an inductor L1, an auxiliary inductor L2, and division resistors R1 and R2. The power switch 11 according to an exemplary embodiment of the present invention is configured with an n-channel metal oxide semiconductor field effect transistor (NMOSFET). A body diode (BD) is formed between a drain and a source of the power switch 11. The current flowing to the power switch 11 will be called a drain current (IDS) hereinafter.

The bridge diode 12 is configured with 4 diodes (not shown), and it full-wave rectifies input AC power (AC) to generate an input voltage (Vin).

An output end of the bridge diode 12 is connected to a first end of the inductor L1. An input voltage (Vin) is supplied to the first end of the inductor L1, and a second end of the inductor L1 is connected to an anode of the diode D1.

An increased or decreased inductor current (IL) becomes an input current (Iin) of the sine wave full-wave rectified through the filter 13.

A drain of the power switch 11 is connected to an anode of the diode D1 and the second end of the inductor L1.

Figure 11:
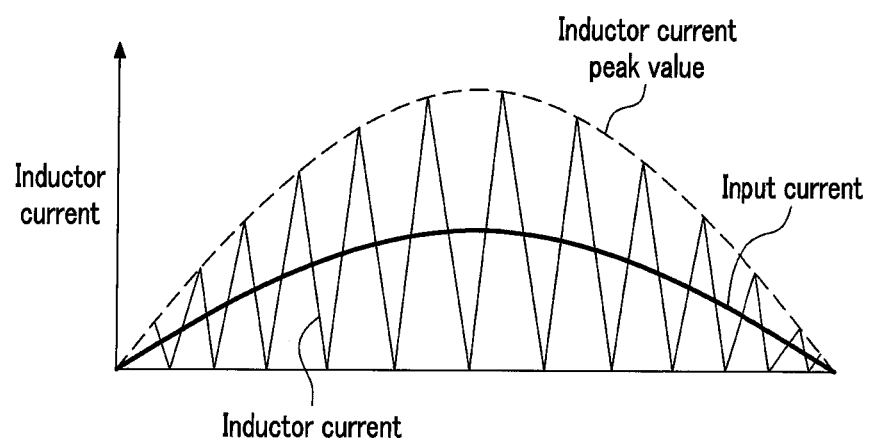
FIG. 11 shows an inductor current and an input current of a general mode power factor correction circuit.

The inductor L1 receives the input voltage (Vin) and generates output power. The inductor current (IL) flowing to the inductor L1 is controlled by the switching operation of the power switch 11. As shown in FIG. 11, the inductor current is a sawtooth waveform, and in detail, it increases while the power switch 11 is turned on and it decreases while the power switch 11 is turned off. In detail, while the power switch 11 is turned on, the inductor current (IL) is increased and the inductor L1 stores energy. While the power switch 11 is turned off, the inductor current (IL) flows through the diode D1, and energy stored in the inductor L1 is transmitted to the output end of the power factor correction circuit 1. When the power switch 11 is turned off and the diode D1 is turned on, the inductor current (IL) flows to a load connected to the output end of the power factor correction circuit 1 and charges the capacitor C1. As the load connected to the output end of the power factor correction circuit 1 is increased, the inductor current (IL) supplied to the load is increased, and hence the current flowing to the capacitor C1 is relatively reduced and the output voltage (Vout) is relatively decreased. When the load is decreased, on the contrary, the inductor current (IL) supplied to the load is reduced, and hence the current flowing to the capacitor C1 is relatively increased and the output voltage (Vout) is relatively increased.

When the power switch 11 is turned on, the diode D1 is turned off and the inductor current (IL) flows through the power switch 11. The power factor correction controller 2 generates an error amplifying signal (Vcon) by using a division voltage (Vd) that is generated by dividing the output voltage (Vout) according to a resistance ratio (R2/(R1+R2)) of the division resistors R1 and R2, and determines a turn-off time of the power switch 11 by comparing the error amplifying signal (Vcon) and a ramp signal (Vramp) having a predetermined period. The turn-on time of the power switch 11 is determined by an auxiliary voltage (Vaux) of the auxiliary inductor L2.

The auxiliary inductor L2 is coupled to the inductor L1 with a predetermined turn ratio (n). In detail, when the turns of the inductor L1 is given as 1 and the turns of the auxiliary inductor L2 is given as N, the turn ratio (n) is N. When the power switch is turned on, the voltage at the auxiliary inductor (Vaux) is the product of the turn ratio (n) and the input voltage (Vin). When the power switch is turned off, the auxiliary voltage (Vaux) is the product of the turn ratio (n) and the voltage (Vin-Vout) that is generated by subtracting output voltage (Vout) from the input voltage (Vin).

In the critical conduction mode power factor correction circuit according to an exemplary embodiment of the present invention, the power switch 11 is turned off, the inductor current (IL) becomes 0, and then resonance is generated between the inductor L1 and a parasitic capacitor (not shown) of the power switch 11. The voltage at the inductor L1 starts to be reduced in the sine wave form, it is synchronized when the auxiliary voltage (Vaux) is reduced to be a predetermined reference voltage, and the power switch 11 is turned on again. The power factor correction controller 2 will now be described in detail.

The power factor correction controller 2 includes a ramp signal generator 21, an input voltage estimator 22, a PWM controller 23, an error amplifier 24, and a reference voltage generator 25.

The error amplifier 24 generates an error amplifying signal (Vcon) by amplifying the difference between an error reference voltage (EVR) provided by the reference voltage generator 25 and the division voltage (Vd). The capacitor C2 is connected to the output end of the error amplifier 24. The error amplifying signal (Vcon) is amplified with a predetermined gain through the capacitor C2, and it is delayed for a predetermined time to be control corrected.

The reference voltage generator 25 generates error reference voltages (EVR1/EVR2) according to input voltage information (IVT). The input voltage information (IVT) is a signal that is determined by the input voltage (Vin), and it is a voltage signal that is variable by the input voltage (Vin). In detail, the reference voltage generator 25 generates an error reference voltage (EVR) for generating an output voltage that is greater than a peak value of the input voltage (Vin) by a predetermined value according to the input voltage information (IVT). When the input voltage (Vin) is low and a lot of boosting occurs so as to maintain the output voltage, the input current is increased which increases loss of the power factor correction circuit. To prevent this problem, a reference voltage for changing the output voltage according to the peak value of the input voltage (Vin) is generated. In detail, the reference voltage generator 25 increases the error reference voltage (EVR) as the input voltage information (IVT) is increased, and it reduces error reference voltage (EVR) as the input voltage information (IVT) is reduced.

Since the error amplifier 24 generates the error amplifying signal (Vcon) according to the difference between the error reference voltage (EVR) that is variable by the input voltage (Vin) and the division voltage (Vd), the error amplifying signal (Vcon) is variable by the input voltage (Vin). Since the error reference voltage (EVR) is increased when the input voltage (Vin) is increased, the error amplifying signal (Vcon) is increased. When the input voltage (Vin) is reduced, on the contrary, the error reference voltage (EVR) is reduced and the error amplifying signal (Vcon) is reduced. Accordingly, the range of the error amplifying signal (Vcon) is changed by changing the error reference voltage according to the input voltage information (IVT).

The ramp signal generator 21 generates a ramp signal having a different slope according to the input voltage information (IVT) while the power switch 11 is turned on. The ramp signal generator 21 includes a main current source 211, an additional current source 212, switches 213 and 214, a switch controller 216, and a ramp capacitor 215. First ends of the switch 214 and the switch 213 are connected to first ends of the main current source 211 and the additional current source 212, and second ends of the switch 214 and the switch 213 are connected to a first end of the ramp capacitor 215. Power (Vcc) supplies the voltage for the main current source 211 and the additional current source 212 to generate current. A second end of the ramp capacitor 215 is grounded. The switch 214 is turned on while the power switch 11 is turned on, and when the input voltage information (IVT) is greater than the input reference voltage, the switch 213 is turned on while the switch 214 is turned on. The switches 213 and 214 are controlled by control signals S1 and S2. The switch controller 216 receives input voltage information (IVT) and a gate control signal (Vgs) to generate the control signals S1 and S2. In detail, the switch controller 216 generates a control signal S1 for turning on the switch 214 and transmits the same to the switch 214 during a period in which the gate control signal (Vgs) is a signal for turning on the power switch 11. Also, the switch controller 216 generates a control signal S2 for turning on the switch 213 and transmits the same to the switch 213 while the input voltage information (IVT) is greater than the input reference voltage. When the switch 214 is turned on, the current (IM) of the main current source 211 charges the ramp capacitor 215 to increase the ramp signal (Vramp) with the slope that is determined by the current (IM). When the switch 213 is turned on while the switch 214 is turned on, the ramp capacitor 215 is charged with the current (IA+IM) that is the sum of the current (IA) of the additional current source 212 and the current (IM), and the rising slope of the ramp signal (Vramp) becomes greater.

The ramp signal generator 21 includes an additional current source, to which the present invention is not restricted, and it may include a plurality of additional current sources, and a plurality of switches may be provided between the plurality of additional current sources and the ramp capacitor 215. Then, as the input voltage information (IVT) is increased, the switch controller 216 sequentially turns on the switches to further increase the slope of the rising ramp signal (Vramp). The switch 217 is connected in parallel to the capacitor 215, it is turned off while the power switch 11 is turned on, and it is turned on while the power switch 11 is turned off.

The PWM controller 23 generates a gate signal (Vgs) for controlling the switching operation of the power switch 11 by using an auxiliary voltage (Vaux), a ramp signal (Vramp), and an error amplifying signal (Vcon). The PWM controller 23 includes a PWM comparator 231, an on control signal generator 232, a PWM flipflop 233, and a gate driver 234.

The PWM comparator 231 generates an off control signal (FC) by comparing the ramp signal (Vramp) and the error amplifying signal (Vcon). The PWM comparator 231 includes a non-inverting terminal (+) for receiving a ramp signal (Vramp) and an inverting terminal (−) for receiving an error amplifying signal (Vcon). The PWM comparator 231 generates a High off control signal (FC) when the ramp signal (Vramp) is greater than the error amplifying signal (Vcon), and it generates a Low off control signal (FC) when the ramp signal (Vramp) is less than the error amplifying signal (Vcon). Therefore, when the rising ramp signal (Vream) reaches the error amplifying signal (Vcon), a High off control signal (FC) is output.

The on control signal generator 232 generates an on control signal (NC) for turning on the power switch 11 when the auxiliary voltage (Vaux) becomes less than a predetermined reference voltage. The on control signal generator 232 is synchronized with an on control time when the reduced auxiliary voltage (Vaux) becomes less than the reference voltage after the power switch 11 is turned off, and it generates an on control signal (NC) having a High pulse.

The PWM flipflop 233 generates a gate driver control signal (GDC) for controlling the switching operation of the power switch 11 according to the on control signal (NC) and the off control signal (FC). The PWM flipflop 233 includes a set terminal (S) for receiving the on control signal (NC) and a reset terminal (R) for receiving the off control signal (FC). The PWM flipflop 233 outputs a High gate driver control signal (GDC) through an output end (Q) when the set terminal (S) receives a High signal. The PWM flipflop 233 outputs a Low gate driver control signal (GDC) through the output end (Q) when the reset terminal (R) receives a High signal. When the signals provided to the set terminal (S) and the reset terminal (R) are Low, the PWM flipflop 233 maintains the current gate driver control signal (GDC).

The gate driver 234 generates a gate signal (Vgs) for switching the power switch 11 according to the gate driver control signal (GDC). The gate driver 234 generates a High gate signal (Vgs) for turning on the power switch 11 when receiving a High gate driver control signal (GDC), and generates a Low gate signal (Vgs) for turning off the power switch 11 when receiving a Low gate driver control signal (GDC).

Figure 2:
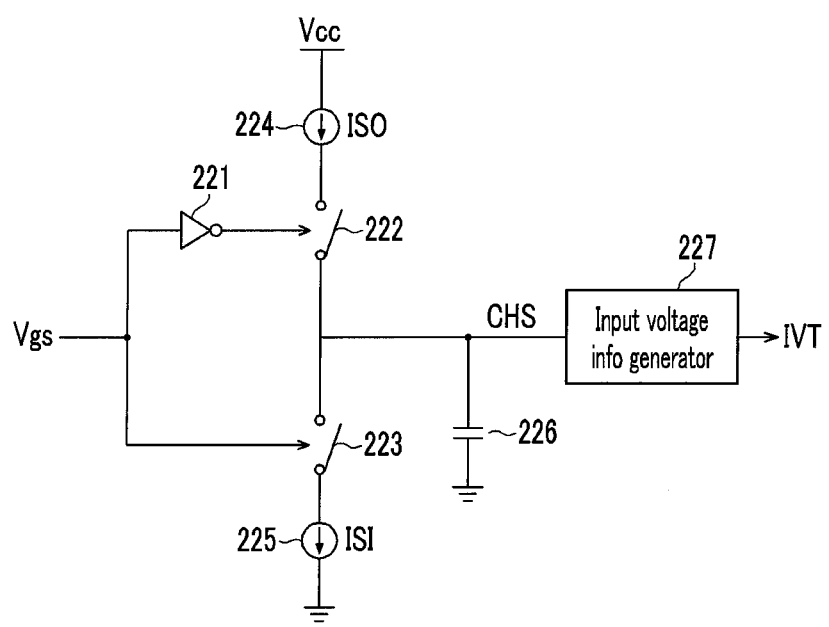
FIG. 2 shows an input voltage estimator according to an exemplary embodiment of the present invention.

Referring to FIG. 2, the input voltage estimator 22 according to an exemplary embodiment of the present invention will now be described. FIG. 2 shows the input voltage estimator 22 according to an exemplary embodiment of the present invention.

The input voltage estimator 22 does not directly sense the input voltage (Vin), but measures duty of the power switch 11 for a predetermined period to estimate the input voltage (Vin).

The input voltage estimator 22 uses the duty of the power switch 11 to estimate the input voltage. The input voltage estimator 22 receives a gate signal (Vgs), generates a check signal (CHS) variable by the duty of the power switch 11, uses the check signal (CHS) to estimate the input voltage, and generates input voltage information (IVT) corresponding to the estimated input voltage. The input voltage estimator 22 includes an inverter 221, a charge switch 222, a discharge switch 223, a source current source 224, a synchronous current source 225, a capacitor 226, and an input voltage information generator 227. The inverter 221 inverts a level of the gate signal (Vgs) and outputs an inverted signal, and the inverted signal output by the inverter 221 controls the switching operation of the charge switch 222. The switching operation by the discharge switch 223 is controlled by the gate signal (Vgs). In detail, the charge switch 222 and the discharge switch 223 are turned on by a High signal, and are turned off by a Low signal. When the gate signal (Vgs) is High, the discharge switch 223 is turned on and the charge switch 222 is turned off. When the gate signal (Vgs) is Low, the discharge switch 223 is turned off and the charge switch 222 is turned on. The capacitor 226 is connected to the synchronous current source 225 when the discharge switch 223 is turned on and the charge switch 222 is turned off. The capacitor 226 is connected to the source current source 224 when the discharge switch 223 is turned off and the charge switch 222 is turned on. When the capacitor 226 is connected to the synchronous current source 225, it is discharged by the synchronous current (ISI), and the voltage of the check signal (CHS) falls. When the capacitor 226 is connected to the source current source 224, it is charged by the source current (ISO), and the voltage of the check signal (CHS) rises. Therefore, the check signal (CHS) is reduced since the gate signal (Vgs) is High while the power switch 11 is turned on, and the check signal (CHS) is increased since the gate signal (Vgs) is Low while the power switch 11 is turned off. The input voltage information generator 227 senses the level of the check signal (CHS) to estimate the input voltage (Vin), and generates input voltage information (IVT) according to the estimation result.

The power factor correction circuit 1 is controlled to maintain the output voltage (Vout). When the output voltage (Vout) is increased, the division voltage (Vd) is increased and the error amplifying signal (Vcon) is reduced. The time for the ramp signal (Vramp) to reach the error amplifying signal (Vcon) is reduced, and the PWM comparator 231 generates a High off control signal (FC) at an earlier time. Then, the duty of the power switch 11 is reduced to reduce energy stored in the inductor L1. When the power switch 11 is turned off, the input current (Iin) flows through the diode D1, and since the energy stored in the inductor L1 is reduced, the input current (Iin) is also reduced to decrease the current for charging the capacitor C1. When the diode D1 is turned off, the capacitor C1 is discharged, and since the charged amount is reduced while the diode D1 is turned on, the output voltage (Vout) is reduced.

On the contrary, when the output voltage (Vout) is reduced, the division voltage (Vd) is reduced and the error amplifying signal (Vcon) is increased. The time for the ramp signal (Vramp) to reach the error amplifying signal (Vcon) is increased, and the PWM comparator 231 generates a High off control signal (FC) at a later time. The duty of the power switch 11 is increased to increase energy stored in the inductor L1. When the power switch 11 is turned off, the input current (Iin) flows through the diode D1, and since the energy stored in the inductor L1 is increased, the input current (Iin) is also increased to increase the current for charging the capacitor C1. When the diode D1 is turned off, the capacitor C1 is discharged, and since the charged amount is increased while the diode D1 is turned on, the output voltage (Vout) is increased.

The change of the duty according to increase/decrease of the output voltage (Vout) and increase/decrease of the output voltage (Vout) according to the change of the duty occur at regular intervals of single switching of the power switch 11. Resultantly, the output voltage (Vout) is maintained.

The relationship between the duty, the input voltage, and the output voltage satisfies Equation 1.

$$\text{duty}=1-(\text{input voltage}(Vin)/\text{output voltage}(Vout)) \quad \text{(Equation 1)}$$

When the output voltage (Vout) is maintained, the duty of the power switch 11 and the input voltage (Vin) are inversely related.

FIG. 3 shows a result of a relationship between AC voltage (Vac), load, and duty of input AC power (AC) according to Equation 1.

Since the input voltage (Vin) is a rectified sine wave, when the input voltage (Vin) is the lowest voltage, that is, 0 volts, the duty is calculated as 100% irrespective of the AC voltage of the AC power (AC).

The peak value of the input voltage (Vin) depends on the AC voltage. When the AC voltage is 115Vac, the peak voltage is 163V, and when the AC voltage is 230Vac, the peak voltage is 325V. Therefore, the peak values of the input voltage (Vin) are 163V and 325V, respectively. When the loads connected to the output end of the power factor correction circuit 1 are 100% and 25%, the measured duty according to the input voltage (Vin) are shown in the table of FIG. 3.

When the AC voltage is 115Vac, the duty is greater than 50%, and when the AC voltage is 230Vac, the duty is less than 50%. When the input voltage (Vin) is low in the same load condition, the duty is increased. The input voltage information generator 227 uses this relationship to generate input voltage information (IVT).

That is, as the duty is increased, the period in which the gate signal (Vgs) is High is increased and the on state period of the discharge switch 223 is increased. Therefore, since the period in which the capacitor 226 is discharged is increased, the voltage range of the check signal (CHS) is reduced. On the contrary, as the duty is decreased, the period in which the gate signal (Vgs) is Low is increased and the on state period of the charge switch 222 is increased. Therefore, since the period in which the capacitor 226 is charged is increased, the voltage range of the check signal (CHS) is increased.

The input voltage information generator 227 estimates a voltage range of the check signal (CHS), and generates input voltage information (IVT) corresponding to the estimated voltage range. The input voltage information generator 227 identifies the check signal (CHS) with reference to the duty of 50%. The input voltage information generator 227 generates input voltage information (IVT) for indicating a low input voltage when the voltage range of the check signal (CHS) is greater than the duty of 50%, and it generates input voltage information (IVT) for indicating a high input voltage when the voltage range of the check signal (CHS) is less than the duty of 50%.

Figure 4:
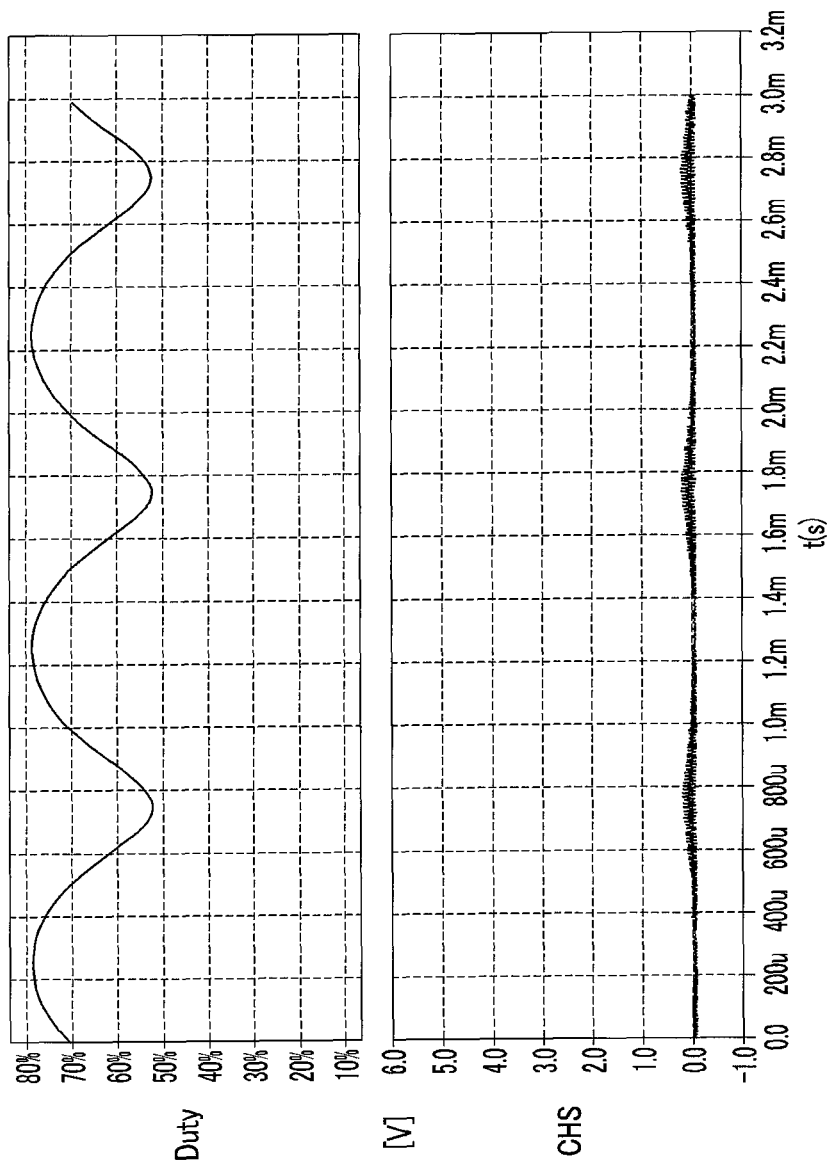
FIG. 4 shows a duty change and a check signal (CHS) when the duty variation is 53%-79%.

FIG. 4 shows a duty change and a check signal (CHS) when the duty variation is 53%-79%.

Figure 5:
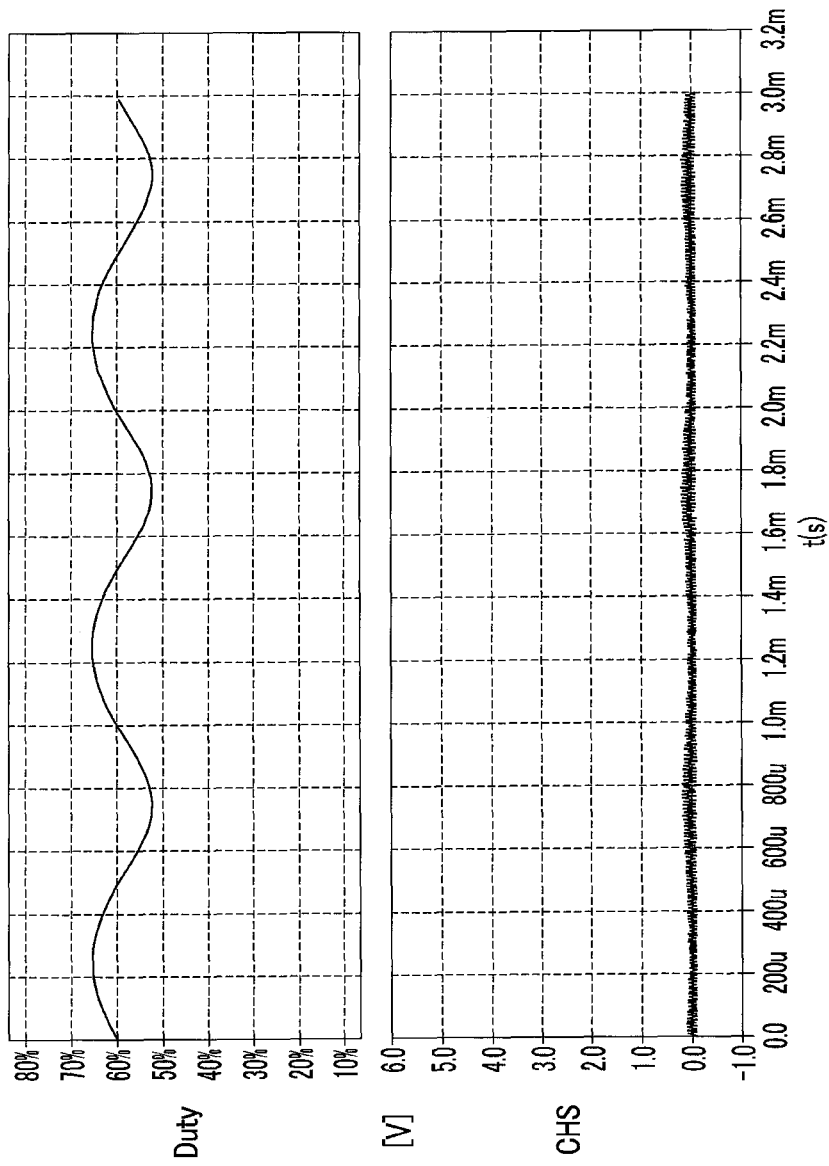
FIG. 5 shows a duty change and a check signal (CHS) when the duty variation is 53%-66%.

FIG. 5 shows a duty change and a check signal (CHS) when the duty variation is 53%-66%. As shown in FIGS. 4 and 5, the check signal (CHS) has the voltage range that is near the ground voltage when the duty is greater than 50%. The input voltage information generator 227 generates input voltage information (IVT) for indicating a low input voltage when the check signal (CHS) has a range of the ground voltage.

Figure 6:
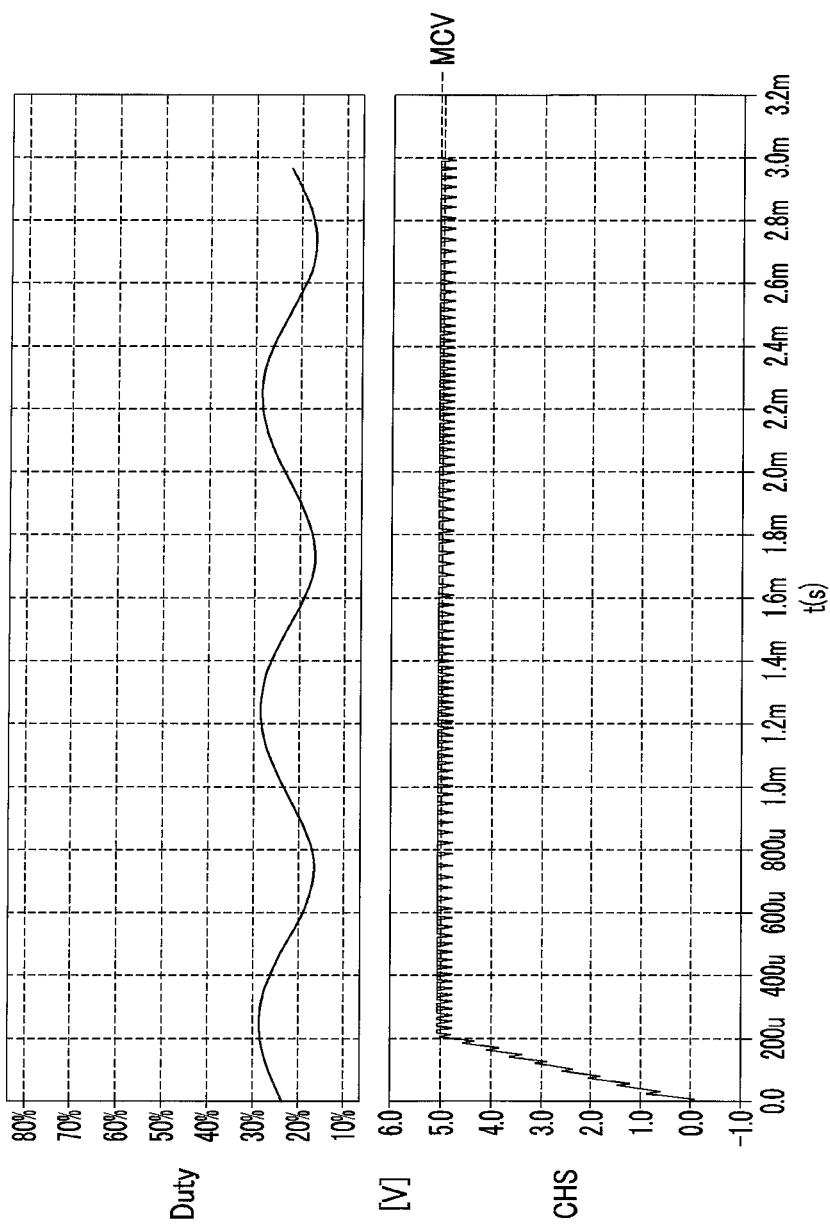
FIG. 6 shows a duty change and a check signal (CHS) when the duty variation is 17%-29%.

FIG. 6 shows a duty change and a check signal (CHS) when the duty variation is 17%-29%. As shown in FIG. 6, the check signal (CHS) reaches the maximum check voltage (MCV) when the duty is less than 50%. In this instance, the maximum check voltage (MCV) represents a maximum voltage that can be charged in the capacitor 226 by the charge current source 224. The input voltage information generator 227 generates input voltage information (IVT) for indicating a high input voltage when the check signal (CHS) reaches the maximum check voltage (MCV).

Figure 7:
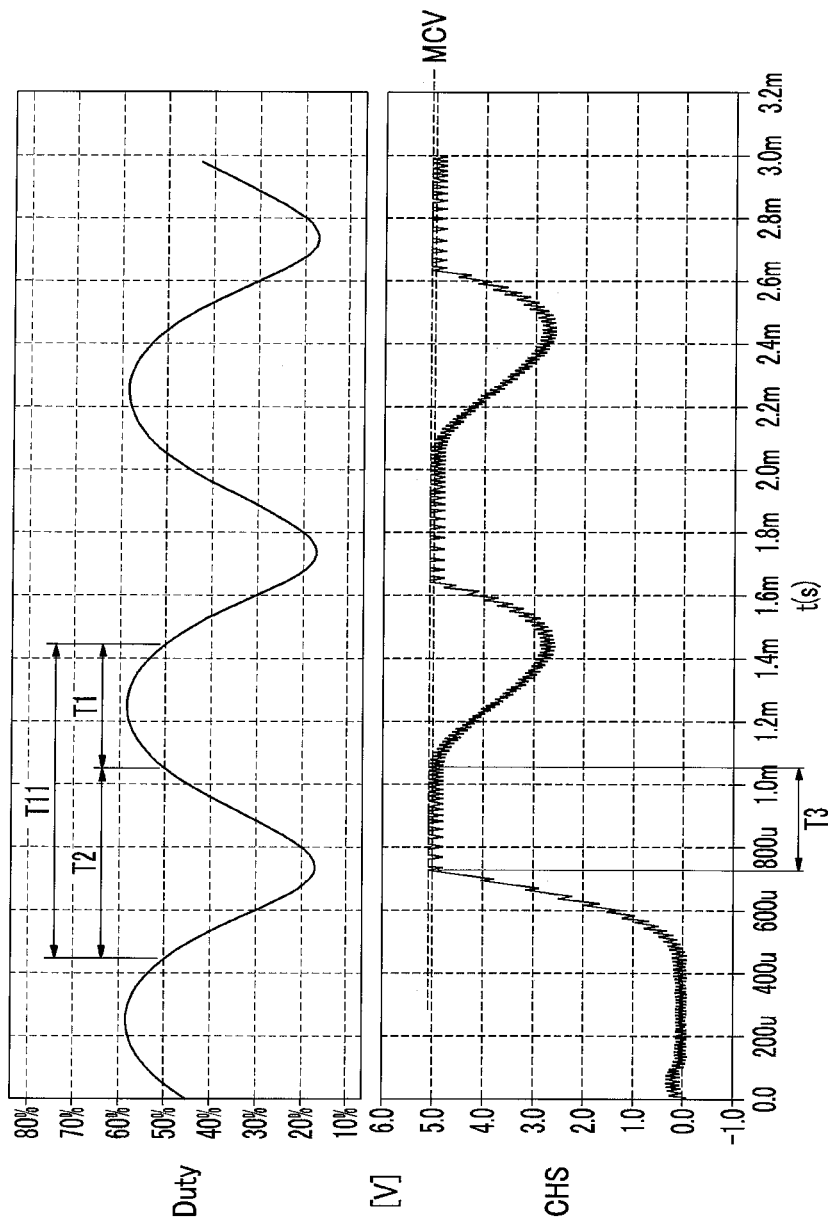
FIG. 7 shows a duty change and a check signal (CHS) when the duty variation is 17%-58%.

FIG. 7 shows a duty change and a check signal (CHS) when the duty variation is 17%-58%. When the duty varies with reference to 50% and the period T2 in which the duty is less than 50% is longer than the period T1 in which the duty is greater than 50% during the unit period T11, the period T3 in which the check signal (CHS) reaches the maximum check voltage (MCV) is generated. The input voltage information generator 227 generates input voltage information (IVT) for indicating a high input voltage when there is a period in which the check signal (CHS) reaches the maximum check voltage (MCV).

Figure 8:
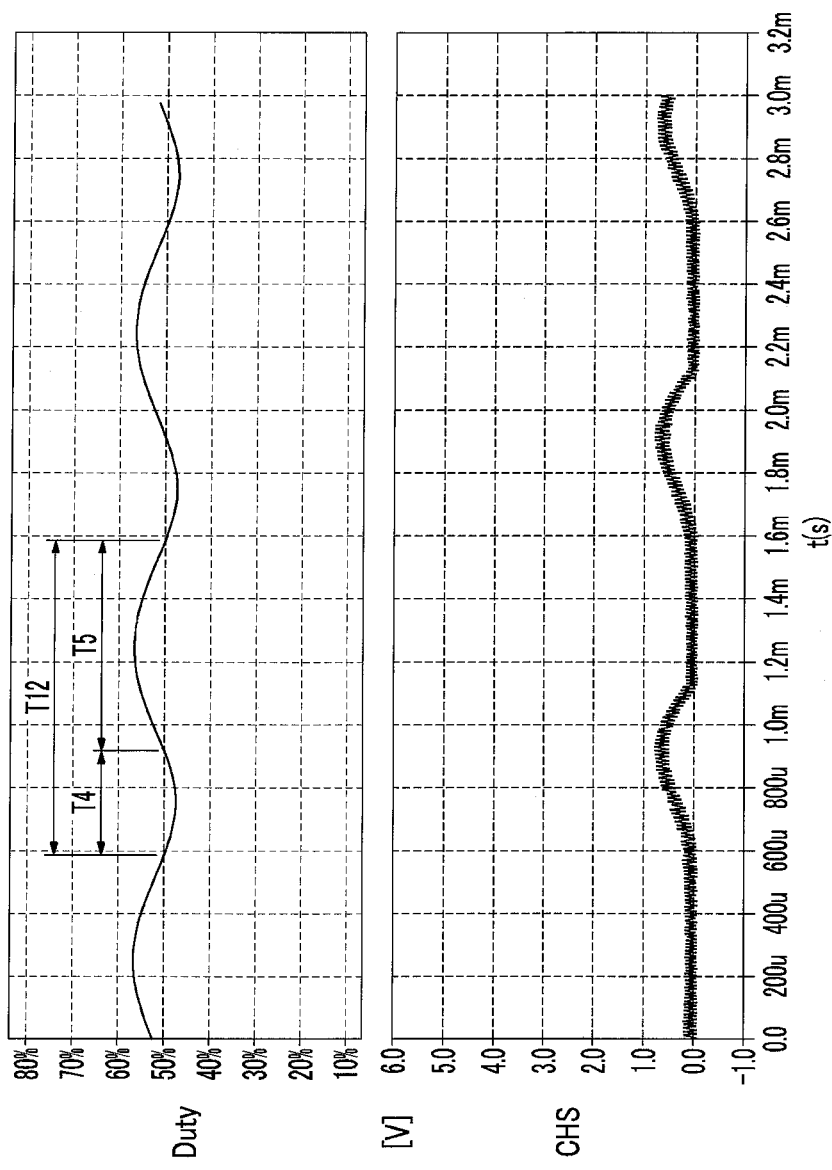
FIG. 8 shows a duty change and a check signal (CHS) when the duty variation is 48%-57%.

FIG. 8 shows a duty change and a check signal (CHS) when the duty variation is 48%-57%. When the duty changes with reference to 50%, when the period T4 in which the duty is less than 50% is shorter than the period T5 in which the duty is greater than 50% during the unit period T12, the check signal (CHS) has a voltage range that is near the ground voltage. The input voltage information generator 227 generates input voltage information (IVT) for indicating a low input voltage since the check signal (CHS) has the voltage range that is near the ground voltage.

Accordingly, the input voltage information generator 227 estimates the voltage range of the check signal (CHS) to generate input voltage information (IVT). It is found therefore that the input voltage (Vin) becomes high or low depending on the duty.

Figure 9A:
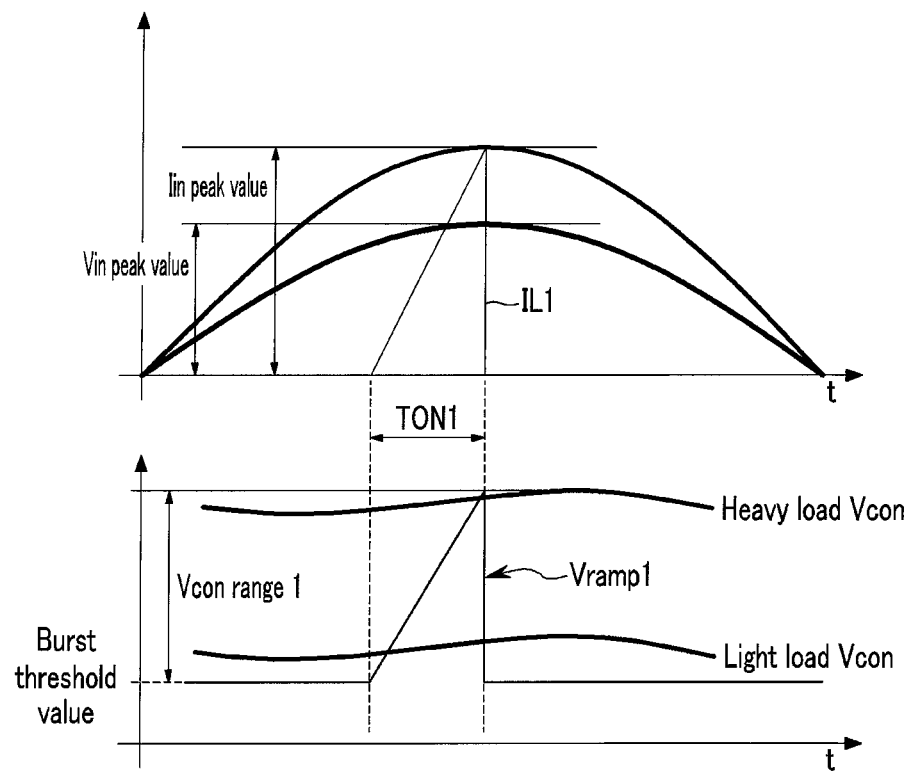
FIG. 9A and FIG. 9B show respective signals corresponding to an input voltage, an input current, a ramp signal, and an error amplifying signal according to an exemplary embodiment of the present invention in a conventional power factor correction circuit.
Figure 9B:
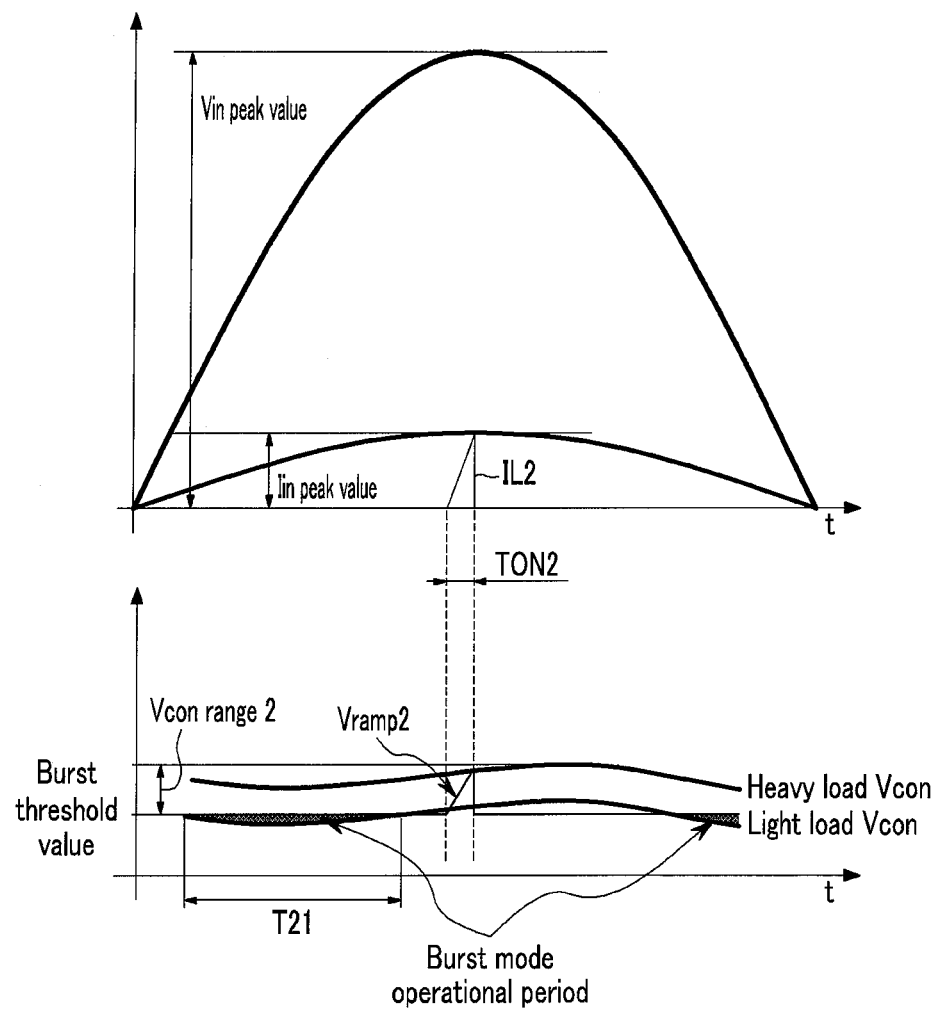

FIG. 9A and FIG. 9B show respective signals corresponding to an input voltage, an input current, a ramp signal, and an error amplifying signal according to an exemplary embodiment of the present invention in a conventional power factor correction circuit. To compare the conventional power factor correction circuit and a power factor correction circuit according to an exemplary embodiment of the present invention, respective signals of the conventional power factor correction circuit will be described by using the same terminology of the exemplary embodiment of the present invention.

As shown in FIG. 9A and FIG. 9B, when the peak value of the input voltage (Vin) is increased, the peak value of the input current (Iin) is reduced with the squared ratio of the ratio of the increased input voltage (Vin). That is, when the peak value of the input voltage (Vin) is increased to be tripled, input current is reduced to be ⅓, and the turn-on time of the power switch is reduced to be ⅓² regarding the peak value of the input current (Iin). The turn-on time of the power switch is determined by the value that is generated by dividing the inductor current by the inductor voltage. That is, when the input voltage (Vin) triples, the voltage at the inductor also triples, and when the input current (Iin) is reduced to be ⅓, the inductor current also reduced to be ⅓. Hence, the turn-on of the power switch is reduced to ⅓². When the ramp signal (Vramp1) that is rising during the period TON1 reaches the error amplifying signal (Vcon1), the power switch is turned off and the inductor current IL1 no longer flows. Also, the power switch is turned off and the inductor current (IL2) no longer flows when the ramp signal (Vramp2) that is rising during the period TON2 reaches the error amplifying signal (Vcon2). The slopes of the ramp signals (Vramp1, Vramp2) are constant in the conventional power factor correction circuit. When the peak value of the input current (Iin) is reduced, the range of the error amplifying signal (Vcon) is reduced from the range 1 of the error amplifying signal (Vcon) to the range 2 of the error amplifying signal (Vcon). In the conventional power factor correction circuit, when the input voltage (Vin) is high and the load is low (i.e., the period T21 in FIG. 9B), the error amplifying voltage (Vcon2) is reduced to reach a burst threshold value level where it is not switched. Then, the power switch 11 is operated in a burst mode in which a switching period and a switching stop period are generated. In the burst mode, the shape of the input current cannot be maintained as a sine wave because of the switching stop period. Then, the power factor improvement effect is substantially deteriorated.

The power factor correction circuit can solve the above-noted problem since the error amplifying signal (Vcon) and the ramp signal (Vramp) are variable by the input voltage information (IVT).

Figure 10A:
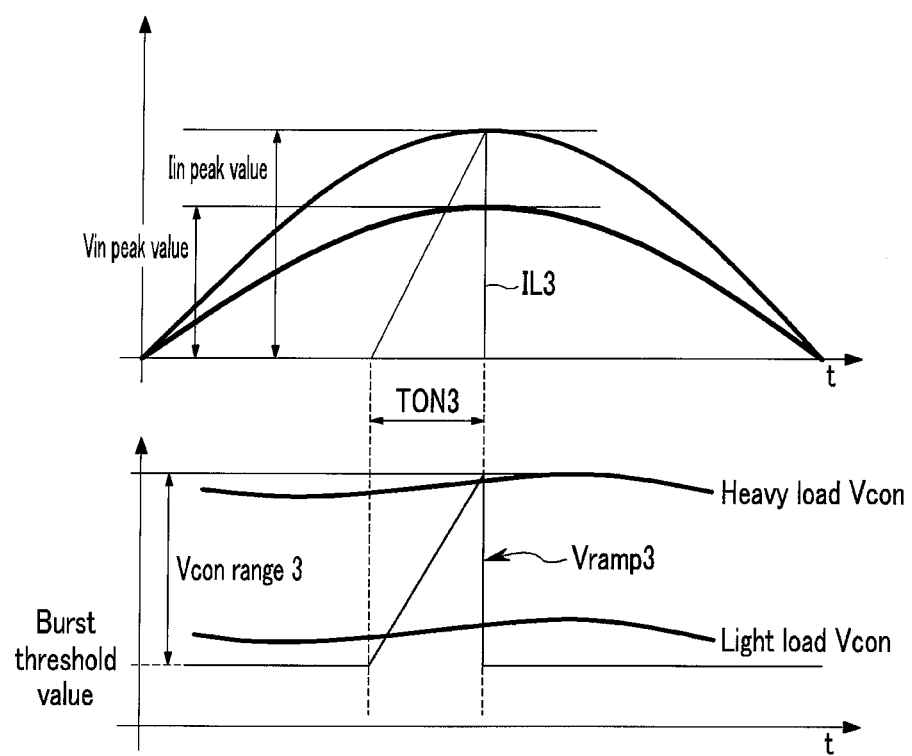
FIGS. 10A and 10B show a voltage range of an input voltage, an input current, a ramp signal, and an error amplifying signal in a power factor correction circuit according to an exemplary embodiment of the present invention.
Figure 10B:
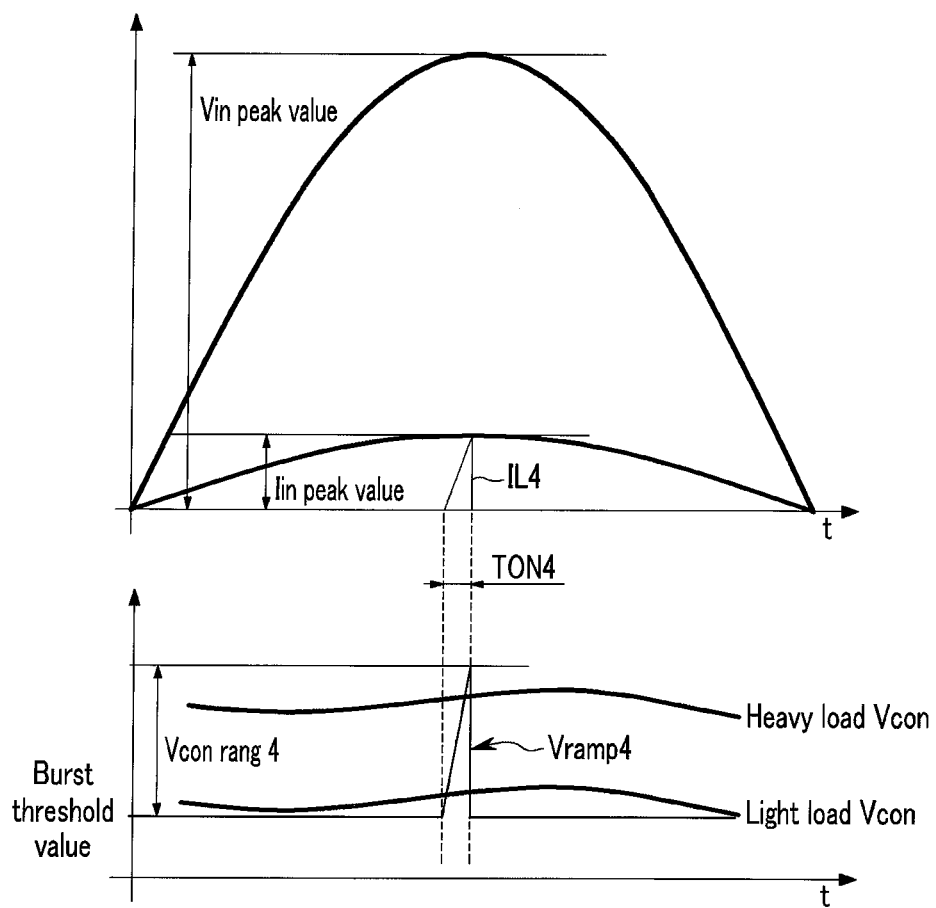

FIGS. 10A and 10B show a voltage range of an input voltage, an input current, a ramp signal, and an error amplifying signal in a power factor correction circuit according to an exemplary embodiment of the present invention.

When the peak value of the input voltage (Vin) is increased, a light-load error amplifying signal (Vcon) is not reduced to be less than the burst threshold value as shown in FIG. 10B. That is, the range (Vcon range 4) of the error amplifying signal (Vcon) is amplified upwardly compared to the range (Vcon range 2) of the conventional error amplifying signal (Vcon) shown in FIG. 9B. Therefore, since the power factor correction circuit is not operated in the burst mode, the waveform of the input current (Iin) is maintained to be a sine wave.

The slope of the ramp signal (Vramp4) is increased compared to the ramp signal (Vramp3). Its purpose is to maintain the on time TON4 of the power switch 11, and it increases the slope of the ramp signal (Vramp4) corresponding to the error amplifying signal (Vcon).

Accordingly, the power factor correction circuit needs information on the input voltage. This is one exemplary embodiment of the present invention, and input voltage information (IVT) of the power factor correction circuit can be used in various ways. Since the power factor correction circuit uses the duty to estimate the input voltage, it needs no additional pin for receiving the input voltage and it can prevent power consumption that occurs when the input voltage is measured.

It has been described in the exemplary embodiment of the present invention that duty information is generated by using the gate signal (Vgs), and in addition to this, all signals for controlling the duty are usable. In detail, it can be one of an output signal of the PWM flipflop 233, an on control signal, and an off control signal for sensing the duty.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power factor correction circuit comprising:
   an inductor for receiving an input voltage and supplying output power;
   a power switch for controlling input current flowing to the inductor, the power switch being connected to the inductor; and
   a power factor correction controller for receiving information on an output voltage of the output power and information on an inductor voltage to control a switching operation of the power switch, sensing a duty ratio of the power switch from a control signal that controls switching operation of the power switch and the control signal is based at least on the information on the inductor voltage, generating a signal corresponding to the sensed duty ratio of the power switch, generating an estimate of the input voltage from the signal corresponding to the duty ratio of the power switch, and determining whether to turn on the power switch according to the information on the inductor voltage.

2. The power factor correction circuit of claim 1, wherein the power factor correction controller comprises:
   an input voltage estimator for generating a check signal that is increased or decreased according to the duty ratio, and generating input voltage information for indicating information on an input voltage according to a voltage range of the check signal.

3. The power factor correction circuit of claim 2, wherein the input voltage estimator includes:
   a discharge switch for performing a switching operation according to the signal corresponding to the duty ratio of the power switch;
   a charge switch for performing a switching operation according to an inverting signal of the signal corresponding to the duty ratio of the power switch; and
   a capacitor for generating the check signal, the capacitor having a first end connected to a node of the discharge switch and the charge switch;
   wherein the input voltage information generator generates the input voltage information according to a voltage range of the check signal.

4. The power factor correction circuit of claim 3, wherein the input voltage estimator generates input voltage information for indicating that the input voltage is low when the check signal has a voltage range that is near a ground voltage, and it generates input voltage information for showing that the input voltage is high when a period in which the check signal reaches a maximum check voltage is generated.

5. The power factor correction circuit of claim 1, wherein the power factor correction controller further includes:
   an error amplifier for generating an error amplifying signal by amplifying a difference between a division voltage corresponding to the output voltage and one of at least two error reference voltages according to the input voltage;
   a ramp signal generator for generating a ramp signal having a slope corresponding to the input voltage; and
   a PWM controller for turning off the power switch according to a comparison result of the ramp signal and the error amplifying signal, and determining whether to turn on the power switch according to information on the inductor voltage.

6. The power factor correction circuit of claim 5, wherein the ramp signal generator includes:
   at least two current sources;
   a capacitor; and
   at least two switches connected between the at least two current sources and the capacitor,
   wherein one of the at least two switches is turned on while the power switch is turned on, and another one of the at least two switches performs a switching operation according to the input voltage.

7. The power factor correction circuit of claim 6, wherein when the input voltage is high, the other one of the at least two switches is turned on.

8. The power factor correction circuit of claim 5, wherein the power factor correction circuit includes:
- an on control signal generator for generating an on control signal for turning on the power switch when an auxiliary voltage corresponding to information on the inductor voltage is less than a predetermined reference voltage;
- a PWM comparator for comparing the ramp signal and the error amplifying signal, and generating an off control signal for turning off the power switch according to a comparison result;
- a PWM flipflop for generating a gate driver control signal for controlling a switching operation of the power switch according to the on control signal and the off control signal; and
- a gate driver for generating a gate signal for switching the power switch according to the gate driver control signal.

9. The power factor correction circuit of claim 8, wherein the auxiliary voltage is a voltage at an auxiliary inductor having a predetermined turn ratio for the inductor and being coupled to the inductor.

10. The power factor correction circuit of claim 8, wherein the duty ratio of the power switch is sensed by using one of the on control signal, the off control signal, the gate driver control signal, and the gate signal.

11. A driving method of a power factor correction circuit including an inductor for receiving an input voltage and supplying an output power, and a power switch being connected to the inductor and controlling input current flowing to the inductor, comprising:
- receiving information on an output voltage of the output power and information on an inductor voltage, and controlling a switching operation of the power switch;
- determining whether to turn on the power switch according to the information on the inductor voltage;
- generating a signal controlling the switching operation of the power switch based at least on the information on the inductor voltage;
- sensing a duty ratio of the power switch from the signal controlling the switching operation of the power switch and generated based at least on the information on the inductor voltage; and
- estimating the input voltage from the sensed duty ratio of the power switch,
wherein estimating the input voltage includes:
- generating a check signal that is increased or decreased according to the duty ratio of the power switch; and
- estimating the input voltage according to a voltage range of the check signal.

12. The driving method of claim 11, wherein generating the check signal includes:
- reducing the check signal while the power switch is turned on; and increasing the check signal while the power switch is turned off.

13. The driving method of claim 12, wherein estimating the input voltage includes:
- determining that the input voltage is low when the check signal has a voltage range that is near a ground voltage; and
- determining that the input voltage is high when a period in which the check signal reaches a maximum check voltage is generated.

14. The driving method of claim 11, wherein controlling the switching operation of the power switch includes:
- generating an error amplifying signal by amplifying a difference between a division voltage corresponding to the output voltage and one of at least two error reference voltages according to the input voltage;
- generating a ramp signal having a slope corresponding to the input voltage; turning off the power switch according to a comparison result of the ramp signal and the error amplifying signal; and
- turning on the power switch according to information on the inductor voltage.

15. The driving method of claim 14 further comprising:
- turning on the power switch when an auxiliary voltage corresponding to information on the inductor voltage becomes less than a predetermined reference voltage.

16. A method of driving a power factor correction circuit:
- detecting a duty ratio of a power switch coupled to an inductor, the power switch controlling input current flowing to the inductor, the duty ratio being detected from a control signal that controls a switching operation of the power switch and is based at least on information on an inductor voltage;
- determining whether to turn on the power switch according to the information on the inductor voltage;
- estimating an input voltage to the inductor based on the duty ratio of the power switch to generate an input voltage estimate signal;
- changing a level of a reference voltage based on the input voltage estimate signal;
- comparing the level of the reference voltage against a level of another voltage indicative of an output voltage of the power factor correction circuit to generate an error signal; and
- controlling switching of the power switch according to the error signal.

17. The method of claim 16 further comprising:
- adjusting a slope of a periodic ramp signal according to the input voltage estimate signal; and
- controlling off time of the power switch based on the ramp signal.

* * * * *